(12) United States Patent
Roberts (10) Patent No.: US 11,797,072 B2
(45) Date of Patent: Oct. 24, 2023

(54) SYSTEM AND METHOD FOR REDUCING POWER CONSUMPTION OF AN INCINERATOR TOILET

(71) Applicant: RESEARCH PRODUCTS/BLANKENSHIP, Dallas, TX (US)

(72) Inventor: Kevin Roberts, Dallas, TX (US)

(73) Assignee: RESEARCH PRODUCTS/BLANKENSHIP, Dallas, TX (US)

(*) Notice: Subject to any disclaimer, the term of this patent is extended or adjusted under 35 U.S.C. 154(b) by 38 days.

(21) Appl. No.: 17/655,976

(22) Filed: Mar. 22, 2022

(65) Prior Publication Data

US 2022/0300057 A1 Sep. 22, 2022

Related U.S. Application Data

(60) Provisional application No. 63/164,317, filed on Mar. 22, 2021.

(51) Int. Cl.
*G06F 1/3206* (2019.01)
*G06F 1/20* (2006.01)

(52) U.S. Cl.
CPC ............ *G06F 1/3206* (2013.01); *G06F 1/206* (2013.01)

(58) Field of Classification Search
CPC ............................... G06F 1/3206; G06F 1/206
See application file for complete search history.

(56) References Cited

U.S. PATENT DOCUMENTS

| | | | | |
|---|---|---|---|---|
| 3,858,251 A | * | 1/1975 | Vollrath | A47K 11/023 4/111.3 |
| 5,123,122 A | * | 6/1992 | Blankenship | A47K 11/023 4/111.5 |
| 5,304,780 A | * | 4/1994 | Blankenship | A47K 11/023 392/379 |

* cited by examiner

*Primary Examiner* — Gary Collins
(74) *Attorney, Agent, or Firm* — Alexander B. Uber; Gray Reed (57) ABSTRACT

An improved control box for an incinerator toilet that improves efficiency of energy utilization through enhanced temperature regulation. Uses multiple cycle timers and temperature switches to ensure safe and effective operating temperatures are maintained without expending excess power in a heating element.

16 Claims, 8 Drawing Sheets

SYSTEM AND METHOD FOR REDUCING POWER CONSUMPTION OF AN INCINERATOR TOILET

CITATION TO PRIOR APPLICATIONS

The present application claims priority to U.S. Provisional Application No. 63/164,317, titled "SYSTEM AND METHOD FOR REDUCING POWER CONSUMPTION OF AN INCINERATOR TOILET" and filed Mar. 22, 2021.

BACKGROUND AND SUMMARY

Incinerator toilets utilize electricity-based heat to incinerate waste to a sterile ash. In conventional designs, upon the actuation of the system (typically via the press of a start or power button), a timer begins and power is provided a motor which circulates air through a burn chamber and catalyst for odor control. Power is also provided to a temperature controller which then verifies that an operably coupled thermocouple is functioning. If the thermocouple is operational, the temperature controller causes power to be provided to a relay. The relay then directs power to a heater (such as a heating coil) which then begins the incineration process. The thermocouple is configured to cause the heater to reach a target temperature in order to maintain sufficient heat within the system to incinerate waste.

Examples of conventional incinerator toilets, and designs thereof, are disclosed in prior patents including U.S. Pat. Nos. 3,921,277; 3,943,579; 4,159,547; 4,205,403; 4,495,873; 4,823,408; 4,905,324; 5,153,942; 5,218,724; 5,304,780; 5,337,422; and 5,361,421. The disclosures of such patents are hereby incorporated by reference in their entirety.

In some conventional designs, temperature was monitored and regulated by two temperature switches. One temperature switch monitored temperature outside of a control box (which might conventionally house a timer, temperature controller, and relay). A second temperature switch monitored the temperature of the ash pan (where ash from incineration is deposited). If either temperature switch detected a temperature above a designated threshold temperature, power would cease being provided to the heater leaving only the fan active to begin cooling the system. In these designs, the timer was set for an initial period of time—in some instances, approximately 75 minutes. Both the heater and fan were configured to continue running during the duration of the timer. The heater could be powered off prior to the end of the 75 minutes in the event that the threshold temperature was reached. Additionally, the fan would continue to run beyond the 75 minutes until a third temperature switch detects that the skin of the incinerator chamber had reached a cooled temperature (conventionally approximately 130 degrees Fahrenheit). The timer, however, would be reset any time the toilet was used.

The present invention is directed to providing an improved control system that allows for cost-effective management of energy usage during the incineration process through incorporation of additional temperature control functionality. Unlike prior, conventional systems, a second use of a toilet configured in accordance with embodiments of this disclosure does not simply reset the heating cycle. Rather, if the start or power button is pressed, the additional temperature control mechanisms will facilitate the elimination of waste and regulate activity of any heating elements until a specified cooled temperature (such as approximately 130 degrees Fahrenheit) has been reached.

When the cooled temperature is achieved, a subsequent pressing of the start or power button may allow the incinerator toilet to resume its normal heating cycle. By utilizing an improved control system with a configuration of switches, relays, and timers in accordance with embodiments of this disclosure, power usage is greatly reduced especially if the toilet is used multiple times over a short period of time.

DETAILED DESCRIPTION

This description, with references to the figures, presents non-limiting examples of embodiments of the present disclosure. Embodiments of this disclosure relate generally to an incinerator toilet having an improved control unit configured to increase power consumption efficiency.

Figure 1:
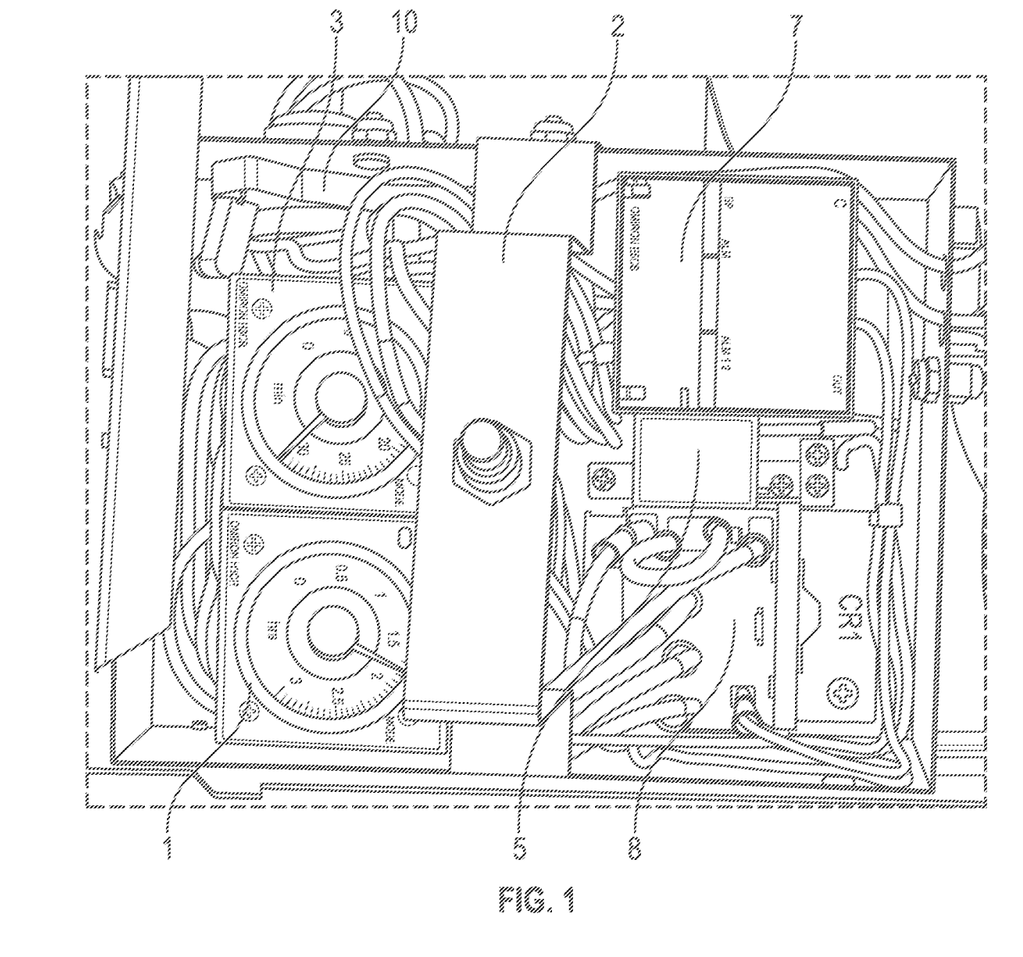
FIG. 1 depicts a top view of a control system in accordance with embodiments of the present disclosure.
Figure 2:
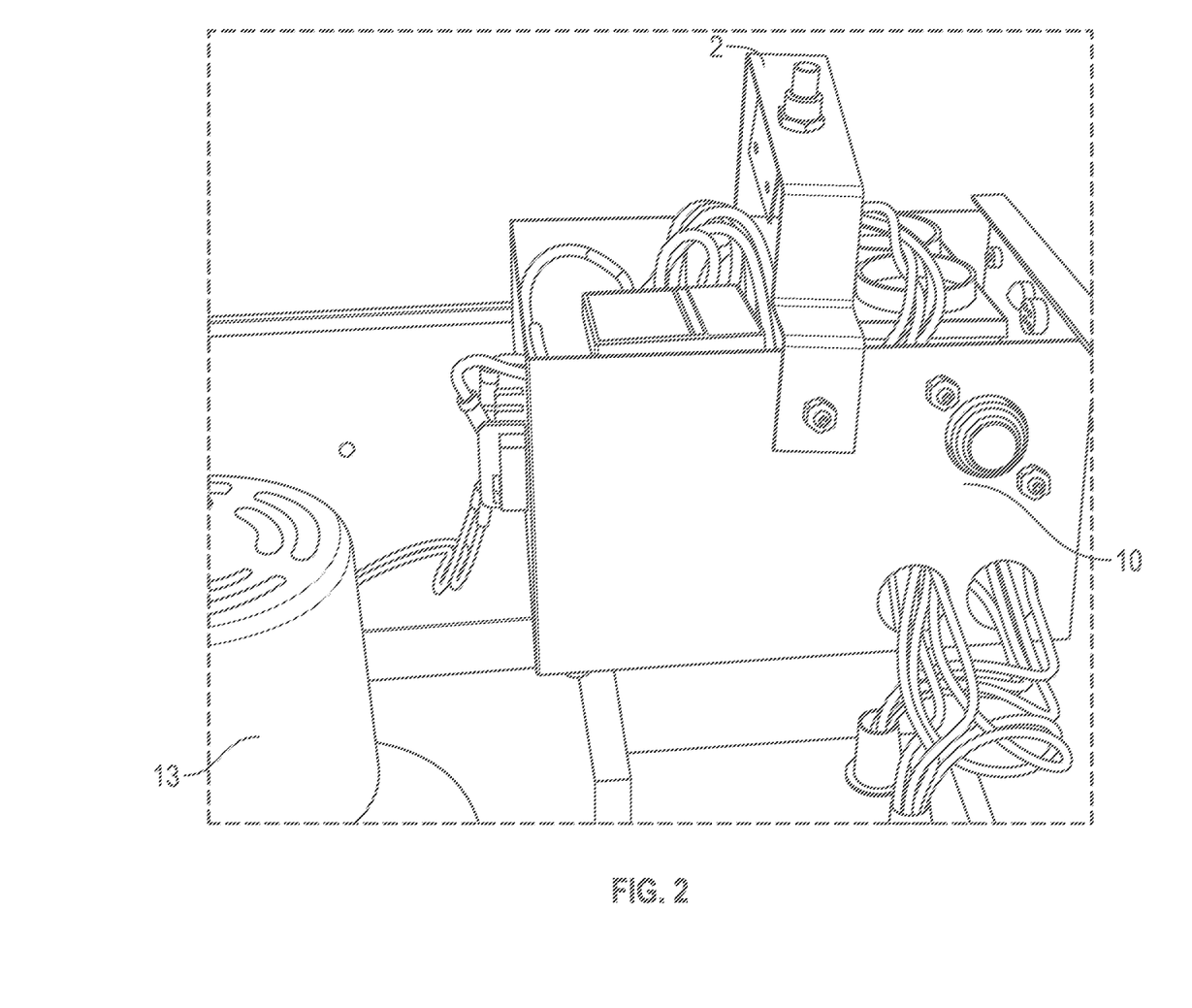
FIG. 2 depicts a side perspective view of a control system and fan in accordance with embodiments of the present disclosure.
Figure 3:
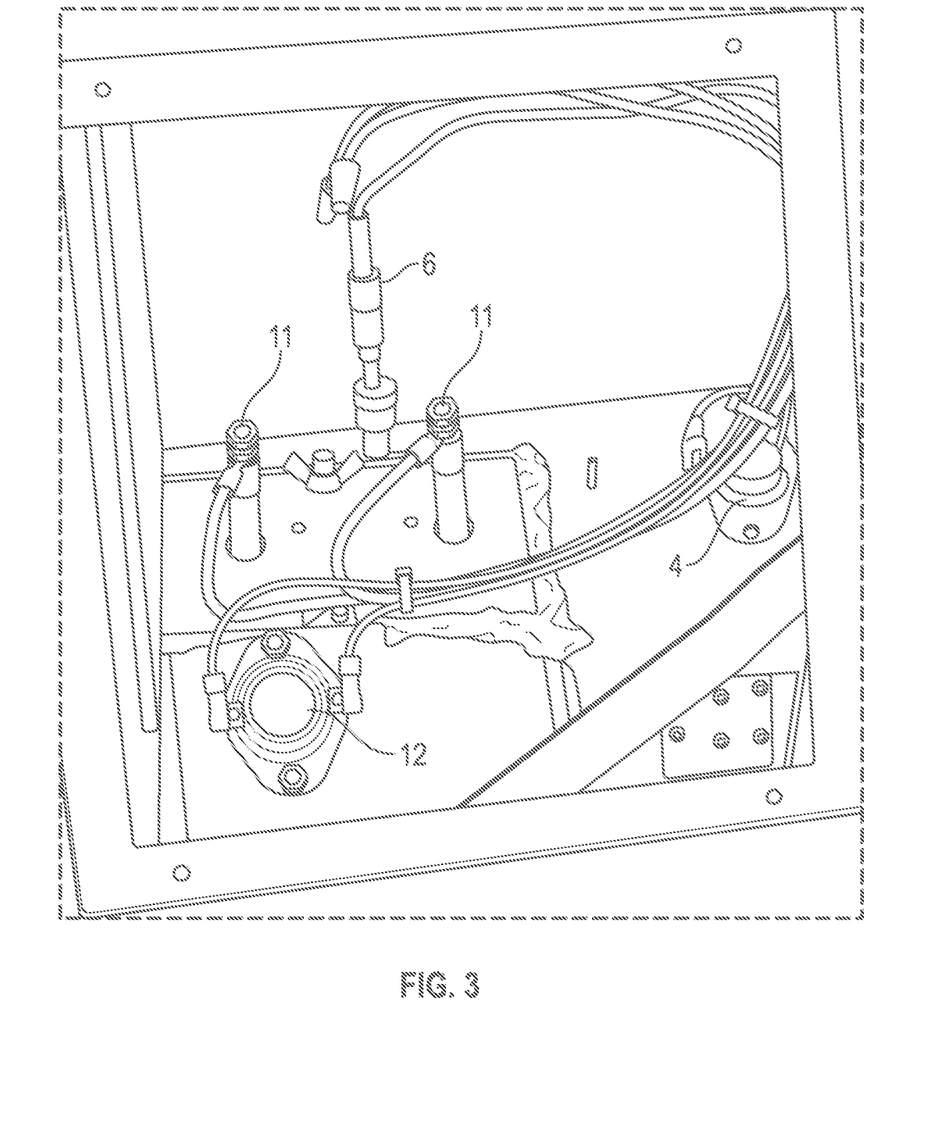
FIG. 3 depicts a side perspective view of a heating element and waste receptacle in accordance with embodiments of the present disclosure.
Figure 4:
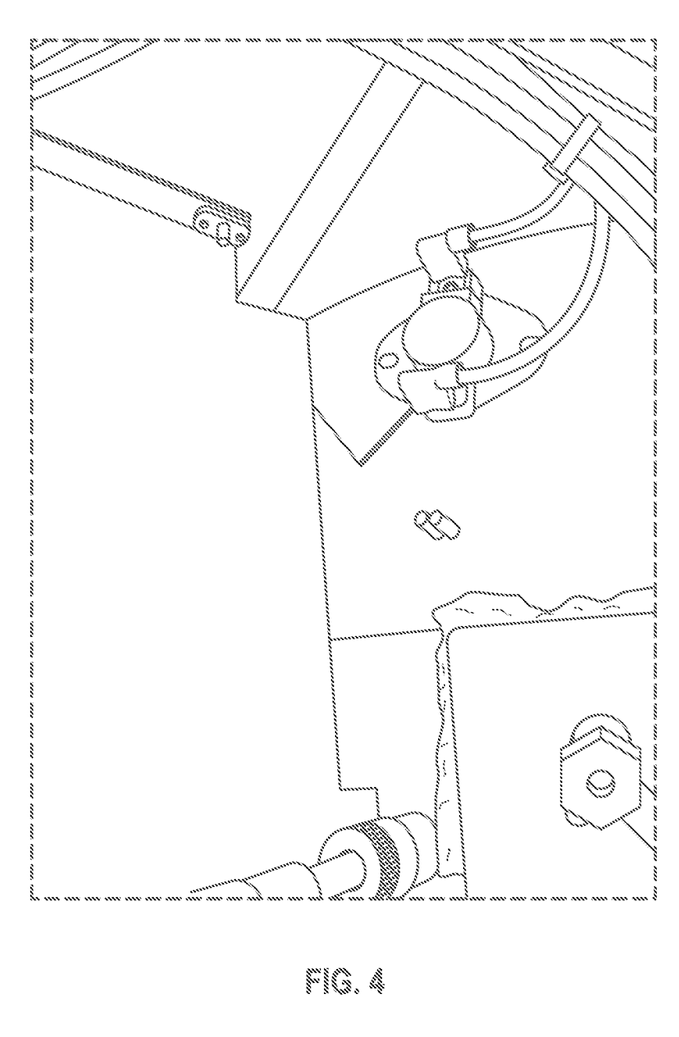
FIG. 4 depicts a waste receptacle temperature switch in accordance with embodiments of the present disclosure.
Figure 5:
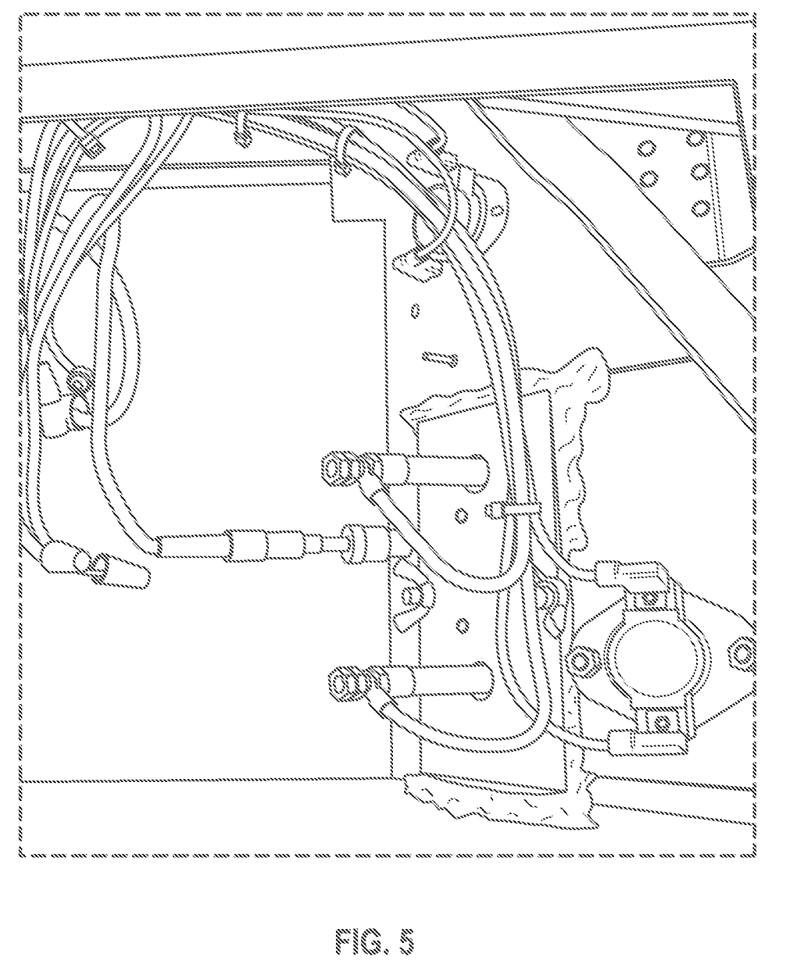
FIG. 5 depicts a heating element temperature switch in accordance with embodiments of the present disclosure.
Figure 6:
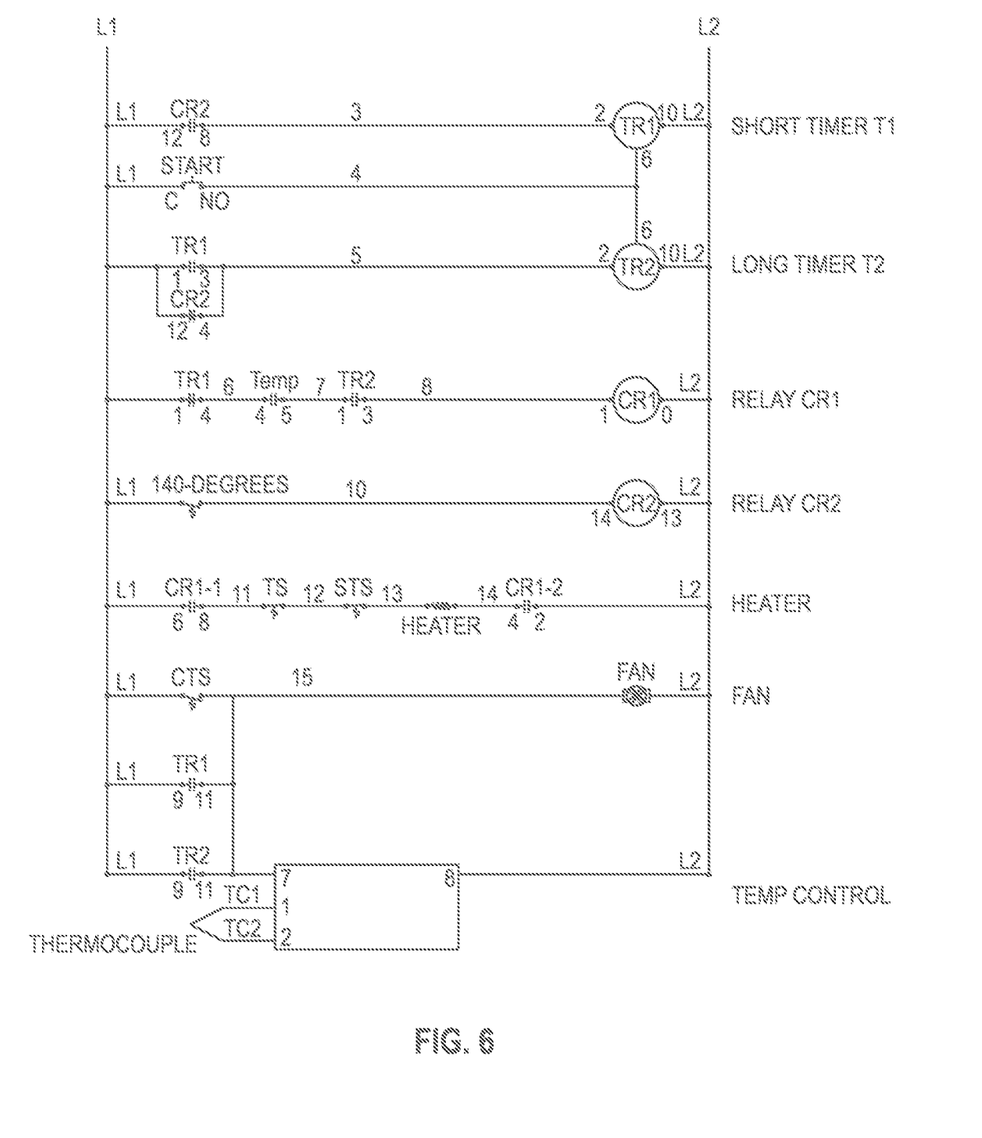
FIG. 6 depicts a schematic view of a circuit arrangement of a control system in accordance with embodiments of the present disclosure.
Figure 7:
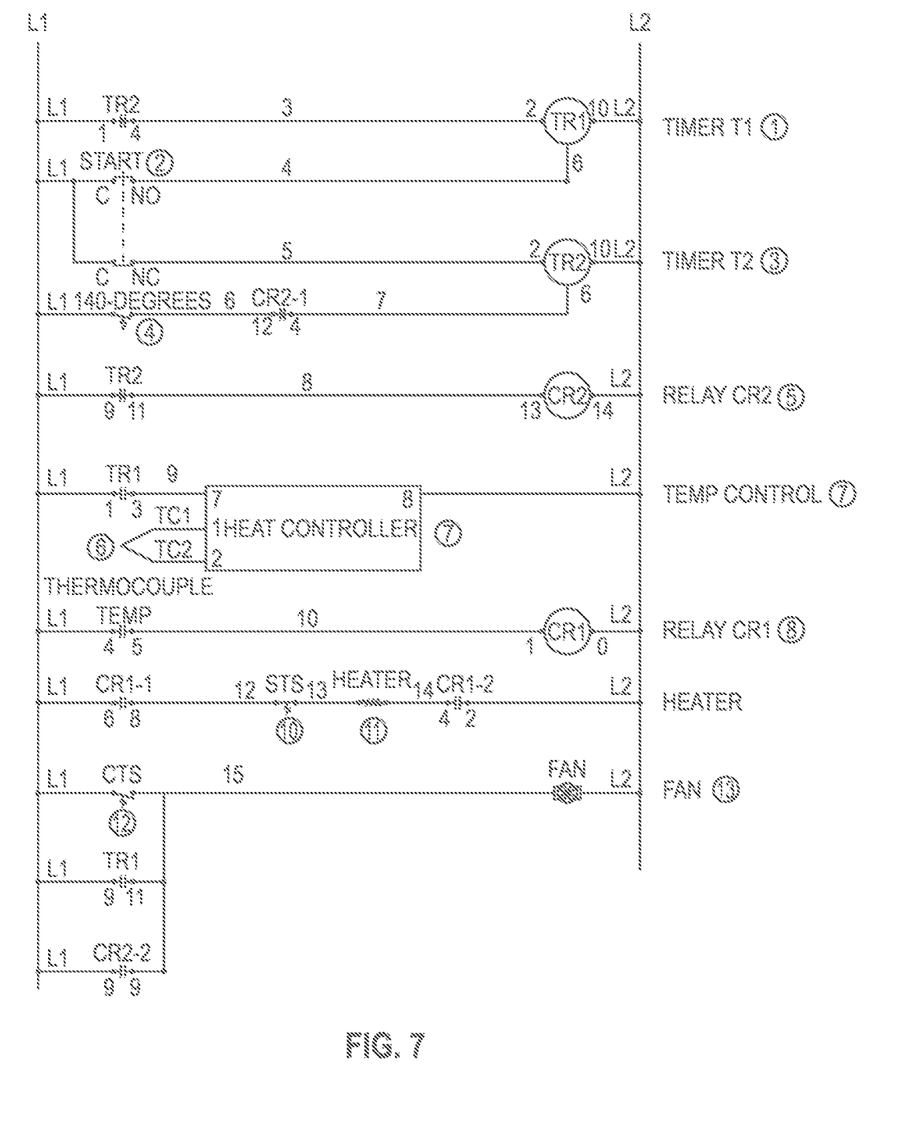
FIG. 7 depicts a schematic view of a circuit arrangement of a control system in accordance with embodiments of the present disclosure.
Figure 8:
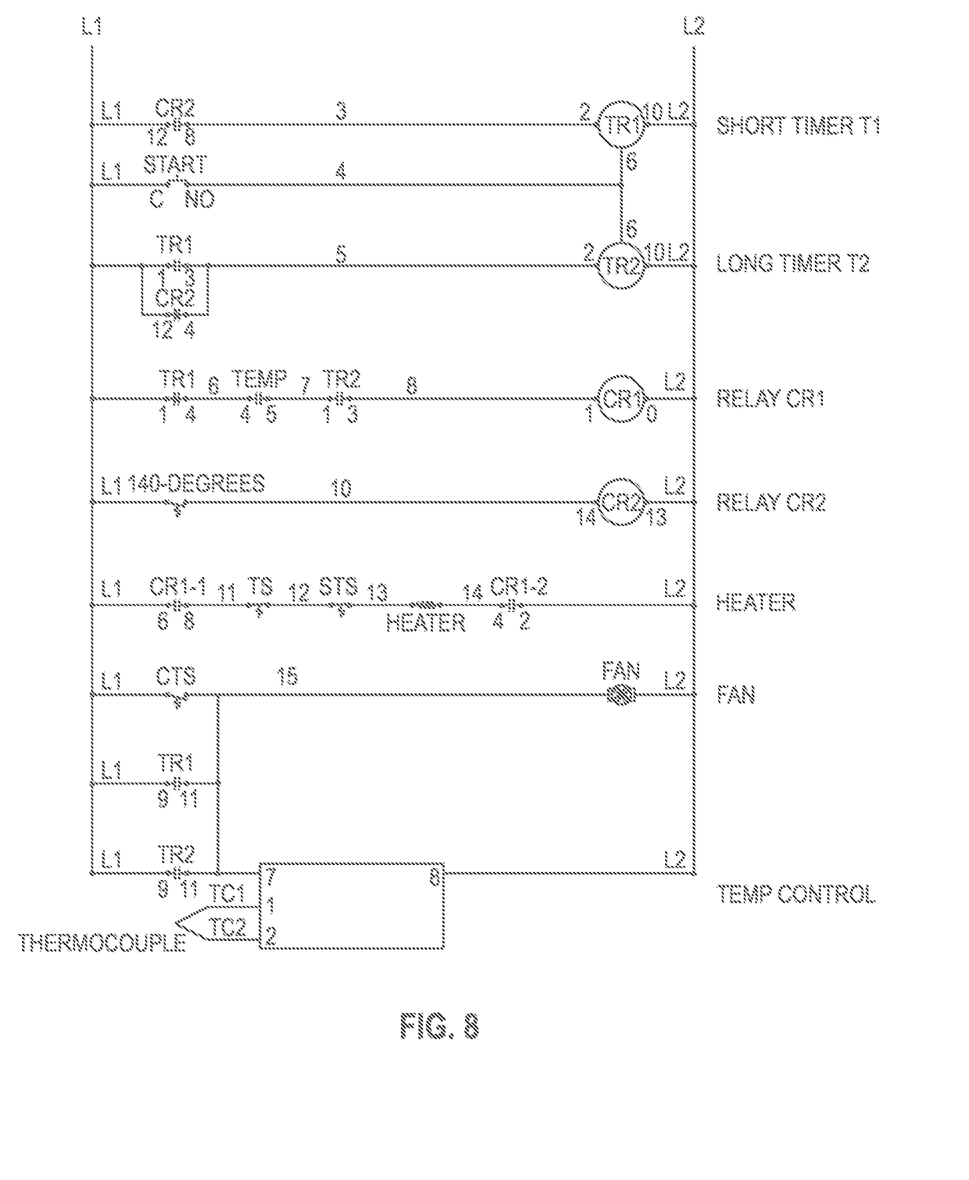
FIG. 8 depicts a schematic view of a circuit arrangement of a control system in accordance with embodiments of the present disclosure.

As depicted in FIGS. 1-5, an incinerator toilet with an improved control unit in accordance with certain embodiments of the present disclosure comprises at least one timer element and at least one electrical switching element. The at least one timer element and at least one electrical switching element may be disposed within an interior volume of a control unit housing. In such embodiments, the at least one timer element may include a primary timer 1 operably coupled to a secondary timer 3. The at least one electrical switching element may include a timer relay 5 operably coupled to both the primary and secondary timers 1, 3. Time relay 5 may be configured to activate the primary timer 1. As set out in FIGS. 6-8, the improved control unit may be configured such that when a start button is pressed on the incinerator toilet, the secondary timer 3 causes power to be provided to, and thereby activates, the primary timer 1 through timer relay 5. During normal operations, once the primary timer 1 is activated, a heater 11 will generate heat for the duration of the primary timer 1. At least one fan 13 may be configured to run as long as either timer is active. The primary and secondary timers 1, 3 may be set to a designated time (such as 75 minutes). As would be understood by those of ordinary skill in the art, the periods for one or both timers can be altered to perform within the scope of this disclosure. Additionally, the at least one electrical switching element may further include an initiation relay 8. Activation of primary timer 1 may be configured to cause power to flow to a temperature controller 7. Temperature controller 7 may then verify the functioning of a thermocouple 6. If verified, temperature controller 7 may then cause power to be sent to initiation relay 8 which then sends power to a heating element 11. Heating element 11 may be a furnace, incinerator, or other conventionally utilized heater capable of burning waste to ash.

In these embodiments the primary timer 1 performs in substantially the same way as the single timer of conventional designs. The primary timer 1 may be deactivated before it has fully run if a target safe temperature threshold is detected by one or more temperature switches. When the primary timer is deactivated, the heating element 11 is also shut down. In some embodiments, the one or more temperature switches may include a control unit switch 2 disposed outside the interior volume of the control unit housing. The one or more temperature switches may also include a processed waste receptable temperature switch 4 positioned near an exterior side of a processed waste receptacle (such as a conventional ash pan).

In further embodiments, the one or more temperature switches may include an energy conservation temperature switch 12 disposed near, or on, the external surface of the heating element 11. The energy conservation temperature switch 12 may be configured to cause primary timer 1 to deactivate, thereby causing heating element 11 to deactivate, once a target heating temperature has been detected. The target heating temperature may be between approximately 900-1000 degrees Fahrenheit. In some embodiments, actuation of a start button on the incinerator toilet may activate primary timer 1. In such embodiments, detection of the target heating temperature may cause primary timer 1 to deactivate and secondary timer 3 to activate. This configuration prevents loss of energy in keeping the heating element powered while still providing power to the fan 13 to regulate temperature.

The one or more temperature switches may also include a fan control temperature switch 10 disposed on an exterior or interior surface of any wall defining the volume of the control unit housing. The fan control temperature switch may be configured to cause secondary timer 3, the fan 13, or both to stop running if a designated cooled temperature is measured. The cooled temperature may be approximately 130 degrees Fahrenheit.

While secondary timer 3 is active, the fan 13 will continue at least until the time set for secondary timer 3 has expired. The fan 13 may be further configured to run until the cooled temperature is reached irrespective of whether primary timer 1 or secondary timer 3 is active. Such a configuration facilitates maintenance of safe operating temperatures. Additionally, as set out in the figures, the circuitry of a control box in accordance with embodiments of this disclosure may be configured such that while secondary timer 3 is active, primary timer 1 may not be activated again thereby preventing reactivation of the heating element 11. This helps conserve energy in the event that the incinerator toilet is used multiple times within the periods of defined by the timers.

Although particular detailed embodiments of the system and method have been described herein, it should be understood that the disclosure is not restricted to the details of these embodiments. Many changes in design, composition, and configuration are possible without departing from the spirit and scope of the instant disclosure. Moreover, while the embodiments disclosed herein describe in particular detail the arrangement and configuration of a control box component of an incinerator toilet, it would be well within the skill of an ordinary practitioner of the art to incorporate, or otherwise implement, an improved control box as set out in the instant disclosure within an otherwise conventional incinerator toilet design.

The invention claimed is:

1. An incinerator toilet comprising:
   a processed waste receptacle;
   a heating element;
   a fan; and
   a control unit, said control unit comprising:
      at least one timer, wherein a primary timer of said at least one timer is configured to activate upon actuation of an actuating element of an incinerator toilet, wherein said primary timer is further configured to deactivate upon activation of a secondary timer of said at least one timer;
      at least one electrical switching element.

2. The incinerator toilet of claim 1 wherein said primary timer is further configured such that said primary timer cannot be reactivated when said secondary timer is active.

3. The incinerator toilet of claim 2 wherein said at least one electrical switching element comprises a heating element deactivation temperature switch configured to deactivate said primary timer and said heating element upon detection of a target heating temperature.

4. The incinerator toilet of claim 3 further comprising a cooling temperature switch configured to deactivate said fan upon detection of a target cooled temperature.

5. The incinerator toilet of claim 4 wherein said control unit further comprises a control unit housing configured to contain said at least one timer and said at least one electrical switching element.

6. The incinerator toilet of claim 5 wherein said heating element deactivation temperature switch is arranged proximal to said control unit housing.

7. The incinerator toilet of claim 6 wherein said cooling temperature switch is arranged proximal to said heating element.

8. The incinerator toilet of claim 7 wherein said target heating temperature is between approximately 900 and 1000 degrees Fahrenheit.

9. The incinerator toilet of claim 8 wherein said target cooled temperature is between approximately 130 and 140 degrees Fahrenheit.

10. An incinerator toilet comprising:
    a processed waste receptacle;
    a heating element configured to activate upon actuation of an actuating element of an incinerator toilet;
    a cooling element configured to activate upon actuation of said actuating element;
    a control unit, said control unit comprising:
       a cooldown timer, wherein said heating element is configured such that said heating element cannot be activated when said cooldown timer is active.

11. The incinerator toilet of claim 10 wherein said control unit further comprises a primary timer configured to activate upon actuation of said actuating element, wherein activating said primary timer causes said heating element to be activated.

12. The incinerator toilet of claim 11 wherein said control unit further comprises a heating element deactivation temperature switch configured to activate said cooldown timer upon detection of a target heating temperature.

13. The incinerator toilet of claim 12 wherein said primary timer is configured to deactivate upon activation of said cooldown timer, and wherein said heating element is configured to deactivate upon activation of said cooldown timer.

14. The incinerator toilet of claim 13 further comprising a cooling temperature switch configured to deactivate said cooling element upon detection of a target cooled temperature.

15. The incinerator toilet of claim 14 wherein said target heating temperature is between approximately 900 and 1000 degrees Fahrenheit.

16. The incinerator toilet of claim 15 wherein said target cooled temperature is between approximately 130 and 140 degrees Fahrenheit.

* * * * *